(12) United States Patent
Dachicourt

(10) Patent No.: US 11,315,322 B2
(45) Date of Patent: Apr. 26, 2022

(54) UNCERTAINTY DISPLAY FOR A MULTI-DIMENSIONAL MESH

(71) Applicant: Bentley Systems, Incorporated, Exton, PA (US)

(72) Inventor: Fabien Dachicourt, Saint Paul de Vence (FR)

(73) Assignee: Bentley Systems, Incorporated, Exton, PA (US)

( * ) Notice: Subject to any disclaimer, the term of this patent is extended or adjusted under 35 U.S.C. 154(b) by 0 days.

(21) Appl. No.: 17/003,571

(22) Filed: Aug. 26, 2020

(65) Prior Publication Data

US 2021/0407196 A1 Dec. 30, 2021

(30) Foreign Application Priority Data

Jun. 25, 2020 (EP) .................................... 20315323

(51) Int. Cl.
*G06T 17/20* (2006.01)
*G06T 5/00* (2006.01)
*G06T 15/20* (2011.01)

(52) U.S. Cl.
CPC .............. *G06T 17/20* (2013.01); *G06T 5/002* (2013.01); *G06T 15/20* (2013.01); *G06T 2207/10028* (2013.01)

(58) Field of Classification Search
None
See application file for complete search history.

(56) References Cited

U.S. PATENT DOCUMENTS

| 2017/0034641 | A1* | 2/2017 | Meshram ................ H04S 7/303 |
| 2019/0043255 | A1* | 2/2019 | Somasundaram ...... G06T 7/344 |
| 2019/0080520 | A1 | 3/2019 | Godzaridris et al. |
| 2020/0349764 | A1* | 11/2020 | Cappello ............... G06T 17/205 |

OTHER PUBLICATIONS

"ContextCapture Quick Start Guide: Software to Automatically Generate Detailed 3D Models from Photographs," ContextCapture Connect Edition, Bentley, Mar. 15, 2017, pp. 1-34.

(Continued)

*Primary Examiner* — Frank S Chen
(74) *Attorney, Agent, or Firm* — Cesari and McKenna, LLP; James A. Blanchette

(57) ABSTRACT

In various example embodiments, techniques are provided for representing uncertainty when displaying a rendered view of a multi-dimensional mesh (e.g., created by SfM photogrammetry) in a user interface by applying a real-time, obfuscation filter that modifies the rendered view based on uncertainty in screen space. Where the multi-dimensional mesh is within a limit of data accuracy, the rendered view is shown without modification (i.e. as normal), and a user may trust the information displayed. Where the multi-dimensional mesh is beyond the limit of data accuracy, the obfuscation filter obfuscates detail (e.g., by blurring, pixilating, edge enforcing, etc.) in the rendered view so that a user may visually perceive the uncertainty. The amount of obfuscation may be weighted based on uncertainty to allow the user to visually quantify uncertainty.

23 Claims, 10 Drawing Sheets

(56) References Cited

OTHER PUBLICATIONS

Di Bartolo, Silvia, et al., "Multitemporal Terrestrial Laser Scanning for Marble Extraction Assessment in an Underground Quarry of the Apuan Alps (Italy)," MPDI, Sensors, Journal, vol. 19, No. 3, 450, Jan. 22, 2019, pp. 1-10.

Dübel, Steve, "Scalable Visualization of Spatial Data in 3D Terrain," Dissertation, Faculty of Computer Science and Electrical Engineering, University of Rostock, Jun. 25, 2019, pp. 1-159.

Dübel, Steve, et al., "Visualizing 3D Terrain, Geo-Spatial Data, and Uncertainty," MDPI, Informatics, Journal, vol. 4, No. 6, Feb. 8, 2017, pp. 1-18.

Klodt, Maria, et al., "Supervising the New with the Old: Learning SFM from SFM," ECCV Paper, Computer Vision Foundation (CVF), Oct. 6, 2018, pp. 1-16.

U.S. Appl. No. 16/679,972, filed Nov. 11, 2019 by Mathieu St-Pierre et al. for Multi-resolution Mesh Real-Time Contouring, pp. 1-31.

U.S. Appl. No. 16/680,034, filed Nov. 11, 2019 by Elenie Godzaridis et al. for Multi-resolution Surface Clipping With Asynchronous Incremental On-Demand Marking of Spatial Index Nodes, pp. 1-26.

U.S. Appl. No. 16/680,081, filed Nov. 11, 2019 by Mathieu St-Pierre et al. for Mesh Smoothing for Visual Quality and Analysis Improvement, pp. 1-38.

Brunet, Pere, et al., "Immersive Data Comprehension: Visualizing Uncertainty in Measurable Models," Review, Frontiers in Robotics and AI, vol. 2, Article 22, Sep. 29, 2015, pp. 1-9.

"European Search Report and Written Opinion," European Application No. 20315323.4-1230, Applicant: Bentley Systems, Incorporated, dated Nov. 24, 2020, pp. 1-7.

Zehner, Björn, "State of the Art of Uncertainty Visualization," 3DGEO-EU, Geo-Energy, 3D Geomodeling for Europe, Project No. GeoE.171.005, Deliverable 4.1, Jun. 21, 2019, pp. 1-29.

* cited by examiner

UNCERTAINTY DISPLAY FOR A MULTI-DIMENSIONAL MESH

RELATED APPLICATION

The present application claims priority to European Patent Application No. 20315323.4, filed Jun. 25, 2020 by Fabien Dachicourt, titled "Uncertainty Display for a Multi-Dimensional Mesh", the contents of which are incorporated by reference herein in their entirety.

BACKGROUND

Technical Field

The present disclosure relates generally to techniques for displaying a rendered view of a multi-dimensional mesh in a user interface, and more specifically to techniques for representing uncertainty when displaying a rendered view of a multi-dimensional mesh in a user interface.

Background Information

A number of types of software applications may generate a multi-dimensional mesh (e.g., a three-dimensional (3-D) textured polygon mesh) that represents a portion of the physical environment (e.g., one or more objects, structures, terrain, etc. in the physical world). One type of software application that may generate a multi-dimensional mesh is a structure from motion (SfM) photogrammetry application, such as the ContextCapture™ application available from Bentley Systems, Inc, which may generate a multi-dimensional commonly referred to as a 3-D reality mesh. A SfM photogrammetry application, such as the ContextCapture™ application, generates a mesh composed of faces (e.g., triangles) formed from vertices connected by edges. The mesh may be generated based on a set of images (e.g., photographs), point clouds, or other representations of the physical environment captured by one or more cameras, scanners, or other devices. The generating often include reconstruction, texturing and annotation, and retouching stages. The end result is typically a mesh that replicates the structure and appearance of a portion of the physical environment.

The information represented in a multi-dimensional mesh created using SfM photogrammetry (or another technique) typically has some uncertainty. In this context, "uncertainty" refers to a measure of data accuracy or resolution. When a multi-dimensional mesh is displayed or otherwise used within a limit of data accuracy (e.g., a limit of resolution), its information may be considered to be a reliable reflection of the physical environment. When a multi-dimensional mesh is displayed or otherwise used beyond the limit of data accuracy (e.g., beyond the limit of resolution), the information may be unreliable, for example, heavily influenced by noise, error, or other sources of inaccuracy.

Some types of visual representations inherently provide an indication of uncertainty to a user when displayed in a user interface. For example, when a user zooms in on a simple bitmap image or texture in a user interface, the image may become blurry or pixilated. The quality loss visually indicates increasing uncertainty as the user zooms in, such that the user is readily aware that they are attempting to use the bitmap image or texture beyond its limit of data accuracy. In contrast, a multi-dimensional mesh typically lacks such an inherent indication of uncertainty. When a user zooms in on a multi-dimensional mesh, the rendered view typically remains sharp and clean, showing geometric details that seem to represent the physical environment. It is unclear whether these geometric details are accurate or largely a product of noise, error, or other sources of inaccuracy.

FIG. 1 is a rendered view 100 of an example multi-dimensional mesh created by SfM photogrammetry viewed within its limit of data accuracy. The information in the rendered view 100 may be considered to be a reliable reflection of the physical environment. FIG. 2 is a rendered view 200 of an example multi-dimensional mesh created by SfM photogrammetry viewed, at least in part, beyond its limit of data accuracy. While the rendered view 200 may appear as sharp and clean as the view 100 in FIG. 1, geometric details in at least part of the rendered view 200 should not be relied upon, as they are largely a product of noise, error, or other sources of inaccuracy.

The lack of an inherent indication of uncertainty with multi-dimensional meshes may lead to users ignoring uncertainty and trusting information beyond the limit of data accuracy. This may lead to false assumptions and bad designs, discrediting use of multi-dimensional meshes, for example, multi-dimensional meshes created by SfM photogrammetry. Further, lack of an inherent indication of uncertainty with multi-dimensional meshes may lead to users assuming that all the information is untrustworthy when a few obvious errors are observed. This may discredit the use of the multi-dimensional meshes, for example, multi-dimensional meshes created by SfM, in design workflows.

Various techniques have been attempted, or could be attempted, to provide users of multi-dimensional meshes with some indication of uncertainty. However, each of these contemplated techniques has shortcomings which have hindered, or would hinder, their widespread adoption.

Some techniques involve providing auxiliary data separate from a multi-dimensional mesh that conveys an indication of uncertainty. For example, a scene description, quality report or uncertainty map may be displayed in a separate window or dialog box alongside a rendered view of the multi-dimensional mesh. While this may be an improvement over having no uncertainty information, such auxiliary data is cumbersome and difficult to interpret. A positive user action may be required to activate the separate window or dialog box. As a result, some users who do not take such positive action may never even see the auxiliary data. Further, once displayed, a user must mentally map the auxiliary data to portions of the multi-dimensional mesh. Such mental mapping may be frustrating and error prone. Still further, the auxiliary data itself may be very technical and require specific skills to interpret properly.

Other techniques involve limiting viewing parameters, such as viewing distance and/or viewing angle, to avoid displaying geometric details of a multi-dimensional mesh that have high uncertainty. For example, a user may be prevented from "zooming in" on a multi-dimensional mesh of depicting a landscape all the way to the ground. However, limits on viewing parameters may be frustrating to users, who may desire to view a multi-dimensional mesh in a particular manner despite uncertainty. Further, they may only crudely correlate with uncertainty. Different portions of a multi-dimensional mesh may have different uncertainty. Limits on viewing parameters sufficient to prevent display of geometric details having high uncertainty in one portion, may prevent the display of relevant geometric details in another portion.

Still other techniques involve deactivating the display of a multi-dimensional mesh and replacing it with another data source when certain viewing parameter thresholds are reached. For example, when a user "zooms in" on a multi-dimensional mesh past a threshold, the display may be replaced with another mesh or image. However, deactivating the display suffers many of the same issues as limiting viewing parameters. It may be frustrating to a user, and when different portions of the multi-dimensional mesh have different uncertainty, may prevent the display of relevant geometric details.

Yet other techniques involve simplifying a multi-dimensional mesh during its production to remove details having high uncertainty. Such simplification changes the geometry of the multi-dimensional mesh and thereby is destructive to data. The data lost during simplification could be useful in later operations. Further, a simplified mesh typically remains sharp and clean, which may mislead a viewer into believing its geometric details are accurate.

Accordingly, there is a need for improved techniques for representing uncertainty when displaying a rendered view of a multi-dimensional mesh in a user interface.

SUMMARY

In various example embodiments, techniques are provided for representing uncertainty when displaying a rendered view of a multi-dimensional mesh (e.g., created by SfM photogrammetry) in a user interface by applying a real-time, obfuscation filter that modifies the rendered view based on uncertainty in screen space. Where the multi-dimensional mesh is within a limit of data accuracy, the rendered view is shown without modification (i.e. as normal), and a user may trust the information displayed. Where the multi-dimensional mesh is beyond the limit of data accuracy, the obfuscation filter obfuscates detail (e.g., by blurring, pixilating, edge enforcing, etc.) so that a user may visually perceive the uncertainty. The amount of obfuscation may be weighted based on uncertainty to allow the user to visually quantify uncertainty. Such an obfuscation-filtered rendered view of a multi-dimensional mesh may provide an intuitive and natural indication of uncertainty to the user.

In one example embodiment, an application renders a view of a multi-dimensional mesh and also determines uncertainty corresponding to the rendered view by obtaining uncertainty in model space for each point of the multi-dimensional mesh visible in the rendered view, and based on the uncertainty in model space computing uncertainty in screen space for each point of the multi-dimensional mesh visible in the rendered view. The application then applies an obfuscation filter to the rendered view that modifies the rendered view based on the uncertainty in screen space for each point and displays the obfuscation-filtered rendered view.

In another example embodiment, a computing device having at least a display screen, processor, and memory configured to store a multi-dimensional mesh and an application, executes the application to render a view of the multi-dimensional mesh and also compute uncertainty in screen space for each point of the multi-dimensional mesh visible in the rendered view. The application applies an obfuscation filter to the rendered view that modifies the rendered view based on the uncertainty in screen space for each point. The obfuscation filter shows the rendered view without modification where uncertainty in screen space is within a limit of data accuracy and obfuscates detail in the rendered view where uncertainty in screen space is beyond the limit of data accuracy. The application then displays the obfuscation-filtered rendered view.

In still another example embodiment, a non-transitory electronic-device readable medium has instructions stored thereon that when executed by one or more electronic devices are operable to render a view of a scene and also compute uncertainty in screen space for each point of the scene visible in the rendered view. The instructions apply an obfuscation filter to the rendered view that modifies the rendered view based on the uncertainty in screen space for each point. The obfuscation filter shows the rendered view without modification where uncertainty in screen space is within a limit of data accuracy and obfuscates detail in the rendered view where uncertainty in screen space is beyond the limit of data accuracy; The instructions then display the obfuscation-filtered rendered view.

It should be understood that a variety of additional features and alternative embodiments may be implemented other than those discussed in this Summary. This Summary is intended simply as a brief introduction to the reader for the further description that follows and does not indicate or imply that the examples mentioned herein cover all aspects of the disclosure or are necessary or essential aspects of the disclosure.

BRIEF DESCRIPTION OF THE DRAWINGS

The description refers to the accompanying drawings of example embodiments, of which.

DETAILED DESCRIPTION

Figure 1:
FIG. 1 is a rendered view of an example multi-dimensional mesh created by SfM photogrammetry viewed within its limit of data accuracy.
Figure 2:
FIG. 2 is a rendered view of an example multi-dimensional mesh created by SfM photogrammetry viewed beyond its limit of data accuracy.
Figure 3:
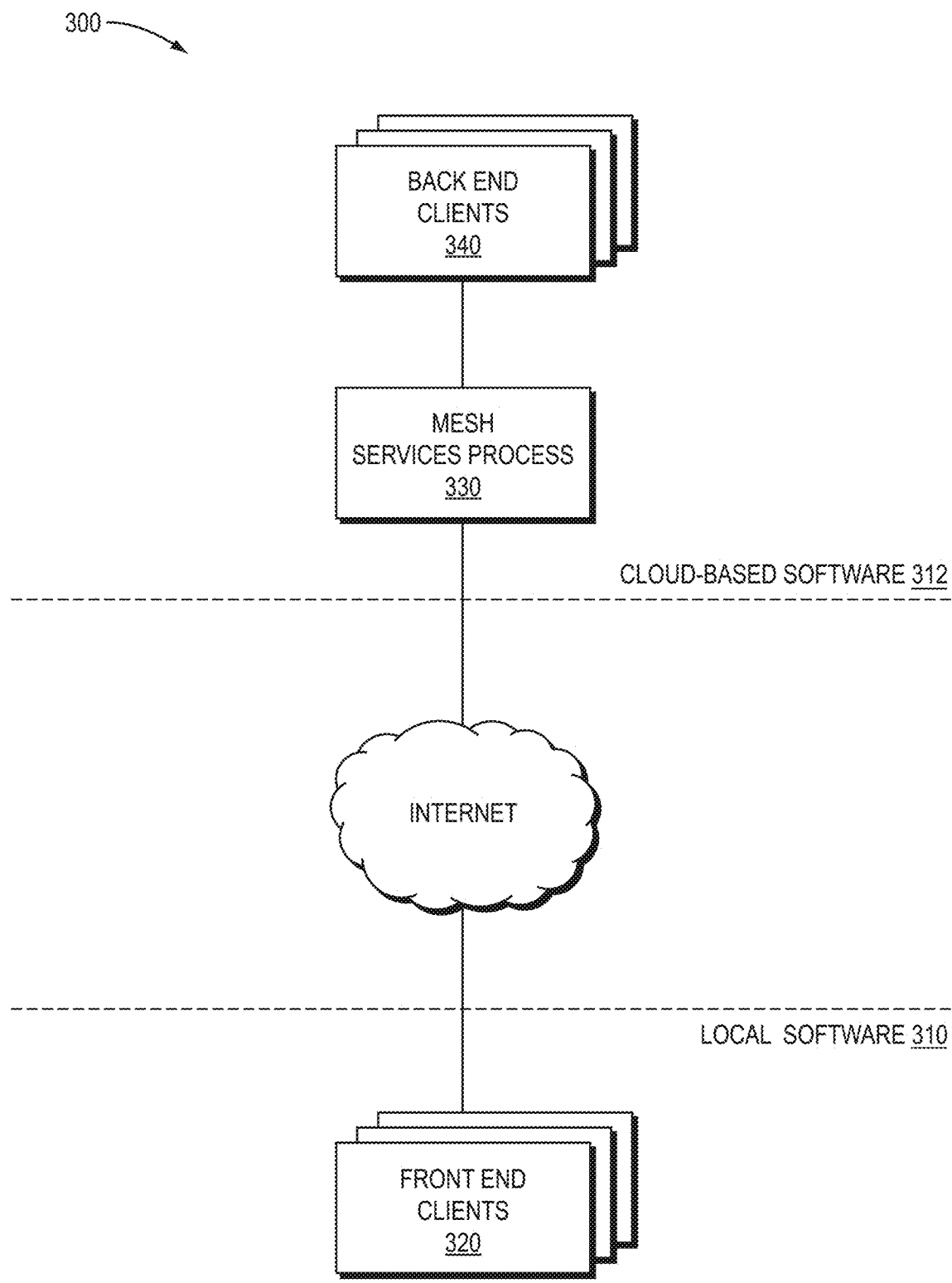
FIG. 3 is a high-level block diagram of an example software architecture for an application that may apply a real-time, obfuscation filter based on uncertainty in screen space to a multi-dimensional mesh (e.g., created by SfM photogrammetry)

FIG. 3 is a high-level block diagram of an example software architecture 300 for an application that may apply a real-time, obfuscation filter based on uncertainty in screen space to a multi-dimensional mesh (e.g., created by SfM photogrammetry). In one embodiment the application is a ContextCapture SfM photogrammetry application available from Bentley Systems, Inc and the multi-dimensional mesh is a SfM-generated mesh produced from a set of images (e.g., photographs), point clouds, or other representations of the physical environment captured by one or more cameras, scanners, etc. (not shown). However, it should be understood that the application may alternatively be any of a variety of other photogrammetry, viewing, modeling, mapping or other types of applications, and the multi-dimensional mesh may alternatively be any of a variety of other types of meshes generated using a variety of other techniques.

The software architecture 300 may be divided into local software 310 that executes on one or more computing devices local to an end-user (collectively "local devices") and cloud-based software 312 that is executed on one or more computing devices remote from the end-user (collectively "cloud computing devices") accessible via a network (e.g., the Internet). Each computing device may include processors, memory/storage, a display screen, and other hardware (not shown) for executing software, storing data and/or displaying information. The local software 310 may include frontend clients 320 operating on local devices. The frontend clients 320 may provide a variety of functions, including providing a user interface for displaying the multi-dimensional mesh and receiving user input. The cloud-based software 312 may include backend clients 340 that may provide a variety of functions, including handling processing intensive operations. To improve performance, the backend clients 340 may be executed on different cloud computing devices or as different threads on the same cloud computing device. The frontend clients 320 and backend clients 340 (collectively "clients") may operate concurrently, with multiple clients 320, 340 conducting reads and writes to edit portions of the mesh in parallel.

A mesh services process 330 may coordinate operation of the application and provide access to the mesh to its clients 320, 340. The mesh services process 330 may include a number of subprocesses (not shown), which perform tasks such as region of interest (ROI) locking, tile computation, and tile storage organization, among a variety of other tasks. The subprocesses of the mesh services process 330 may operate to store the mesh as tiles maintained in files. Such storage may be structured according to any of a number of data structures. In one implementation, the data structures may take the form of an octree.

Figure 4:
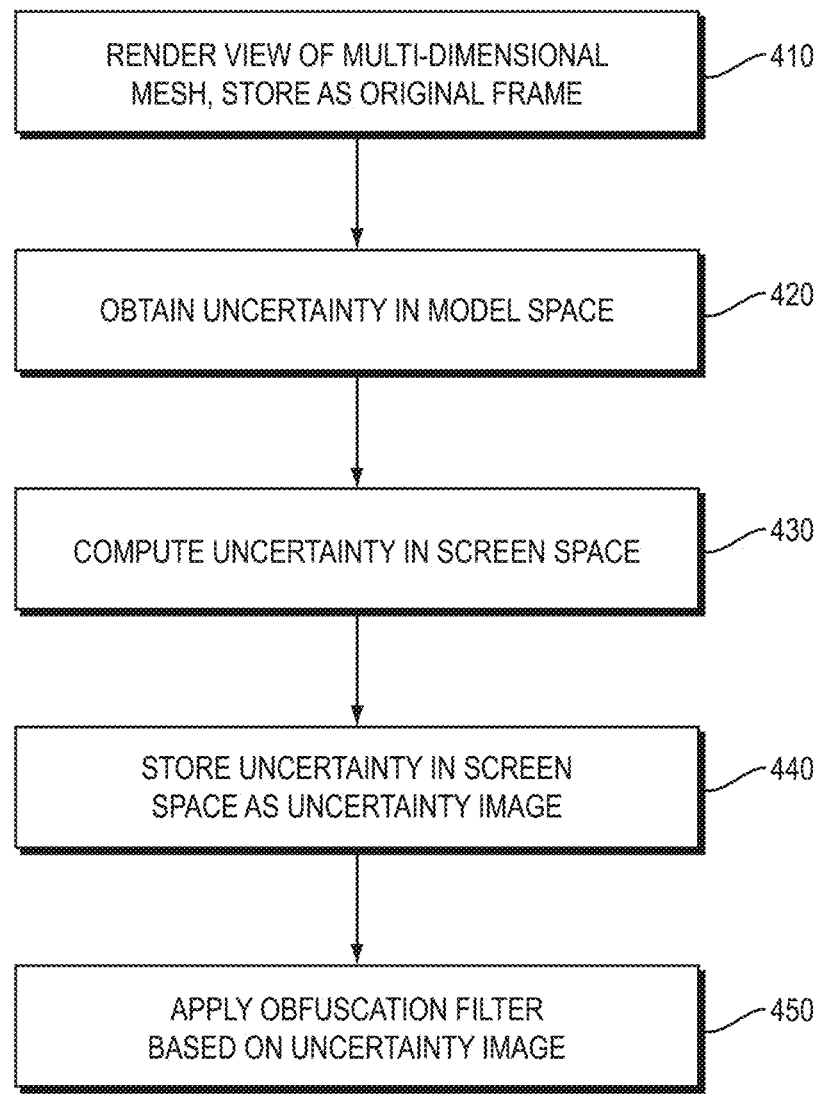
FIG. 4 is a flow diagram of an example sequence of steps that may be executed by the application to apply a real-time, obfuscation filter based on uncertainty in screen space to a multi-dimensional mesh (e.g., created by SfM photogrammetry)
Figure 5:
FIG. 5 is a rendered view for an example multi-dimensional mesh created by SfM photogrammetry that may be produced in FIG. 4 and stored as an original frame.

FIG. 4 is a flow diagram of an example sequence of steps that may be executed by the application to apply a real-time, obfuscation filter based on uncertainty in screen space to a multi-dimensional mesh (e.g., created by SfM photogrammetry). At step 410, the application renders a view of the multi-dimensional mesh based on parameters (e.g., position, rotation, view angle) of a virtual camera in model space. The rendered view may be performed using a coordinates transformation pipeline, details of which are discussed further below. The rendered view may be stored in memory as an original frame composed of a number of individual pixels. FIG. 5 is a rendered view 500 for an example multi-dimensional mesh created by SfM photogrammetry that may be produced in step 410 of FIG. 4 and stored as an original frame.

At step 420, the application obtains uncertainty in model space for each point of the multi-dimensional mesh visible in the rendered view. Uncertainty in model space may take any of a variety of different forms. In simple cases, uncertainty in model space may be uniform. For example, as part of step 420, the application may access a global uncertainty applicable to every point in the multi-dimensional mesh. In more complex cases, uncertainty in model space may be non-uniform. For example, as part of step 420, the application may access a data model that maintains a local uncertainty for each point in the multi-dimensional mesh.

The uncertainty in model space (either global or local) may also be absolute (i.e. considered in relation to an absolute reference) or relative. In a simple case, the uncertainty in model space may be represented by a numeric value in a unit of distance (e.g., in meters) that corresponds to a maximal deviation. Such a numeric value in a unit of distance (e.g., in meters) may form a sphere about a point indicating where the data may actually fall. In a more complex case, the uncertainty in model space may be represented by a vector providing a 3-D error (e.g., with x, y and z-directional components).

At step 430, based on the uncertainty in model space, the application computes uncertainty in screen space for each point of the multi-dimensional mesh visible in the rendered view. The uncertainty in screen space is a region of pixels in screen space formed by the projection of the uncertainty in model space into screen space according to parameters (e.g., position, rotation, view angle) of the virtual camera. For example, where the uncertainty in model space is a numeric value in a unit of distance (e.g., in meters) forming a sphere in model space, the uncertainty in screen space is the region formed from the projection of that sphere. In some cases, the uncertainty in screen space may be simplified. For example, rather than use the exact region, the application may determine a bounding shape (e.g., a bounding circle) having a size (e.g., a diameter) that serves as the uncertainty in screen space.

Figure 6:
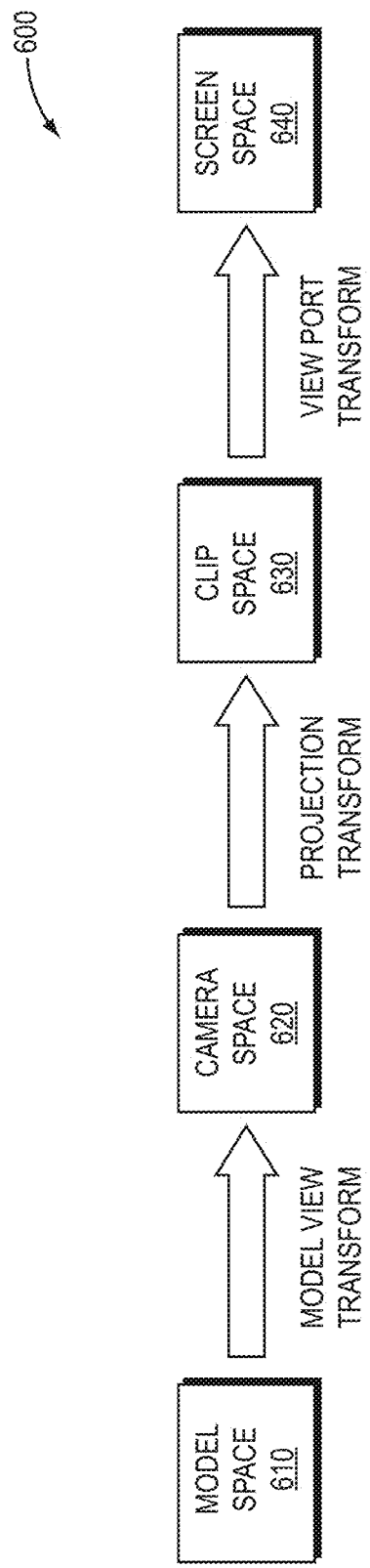
FIG. 6 is a flow diagram of an example coordinates transformation pipeline.

Computation of uncertainty in screen space for each point of the multi-dimensional mesh visible in the rendered view (original frame) may be performed using the coordinates transformation pipeline of the application that is used in rendering the view. FIG. 6 is a flow diagram 600 of an example coordinates transformation pipeline that may perform part of step 430 in FIG. 4. Considering a sphere in model space 610 that represents uncertainty, the application applies a modelview transform to project the sphere into camera space 620 of the virtual camera. The modelview transform is a combination of a modeling transform that places the sphere into the world and a viewing transform that maps the placed sphere into eye coordinates of the camera. The application then applies a projection transform to map the view volume of the transformed sphere that is visible onto a clip coordinate cube in clip space 630. If the transformed sphere lies outside that cube, it will not be part of the rendered view on the screen, and the processing stops. If part of the transformed sphere lies inside and part outside, the part that lies outside is clipped away and discarded, and only the part that remains is processed further. The application then applies a viewport transform to produce the coordinates in screen space 640 from coordinates on the clip coordinate cube in clip space 630.

Returning to FIG. 4, at step 440 the uncertainty in screen space for each point is stored in memory as an uncertainty image having the same dimensions as the original frame. The uncertainty image provides an uncertainty in screen space for each pixel in the original frame. Continuing the example discussed above, the uncertainty image may define a circle of uncertainty for each pixel in the original frame.

At step 450, the application applies an obfuscation filter to modify the rendered view based on the uncertainty in screen space for each point to produce an obfuscation-filtered rendered view. Where uncertainty in screen space is within a limit of data accuracy, the obfuscation filter shows the rendered view without modification. Where uncertainty in screen space is beyond the limit of data accuracy, the obfuscation filter obfuscates detail in the rendered view. The limit of data accuracy may be a predetermined value (e.g., in pixels) that is considered to represent a significant size on the screen. What is considered to represent a significant size on the screen may vary by the implementation. In some implementations, one pixel may set as the predetermined value, such that where uncertainty in screen space is within one pixel, the obfuscation filter shows the rendered view without modification, and where uncertainty in screen space is beyond one pixel, the obfuscation filter obfuscates detail in the rendered view.

More specifically, the application may access the original frame and the uncertainty image from memory and apply them as inputs to the obfuscation filter to produce an obfuscated frame. In some cases, additional frame data (e.g., depth data) and filter settings may also be applied to the obfuscation filter. The obfuscation filter produces an obfuscated frame based on the original frame and uncertainty image, and optionally the additional frame data and filter settings. Where the uncertainty image indicates uncertainty in screen space is within the limit of data accuracy, the obfuscation filter shows the original frame without modification in the obfuscated frame. Where the uncertainty image indicates uncertainty in screen space is beyond the limit of data accuracy, the obfuscation filter modifies the original frame to obfuscate detail based on the uncertainty in screen space and produces obfuscated content in the obfuscated frame. The amount of obfuscation may be weighted based on uncertainty in screen space to visually quantify uncertainty. In such manner, a user may perceive the amount of uncertainty based on the amount of obfuscation present (e.g., 10 pixels of obfuscation may allow a user to perceive the uncertainty is on the order of 10 pixels).

Unless measures were taken, in extreme cases weighting obfuscation based on the uncertainty in screen space could produce unintelligible views. For example, if a few pixels have a very large uncertainty in screen space they could be assigned such a large weight that the resulting obfuscation encompasses the entire frame, rendering it unintelligibly. To address this issue, a limit or cap (e.g., no more than 30 pixels) may be placed on the uncertainty in screen space when used in weighting obfuscation.

Figure 7:
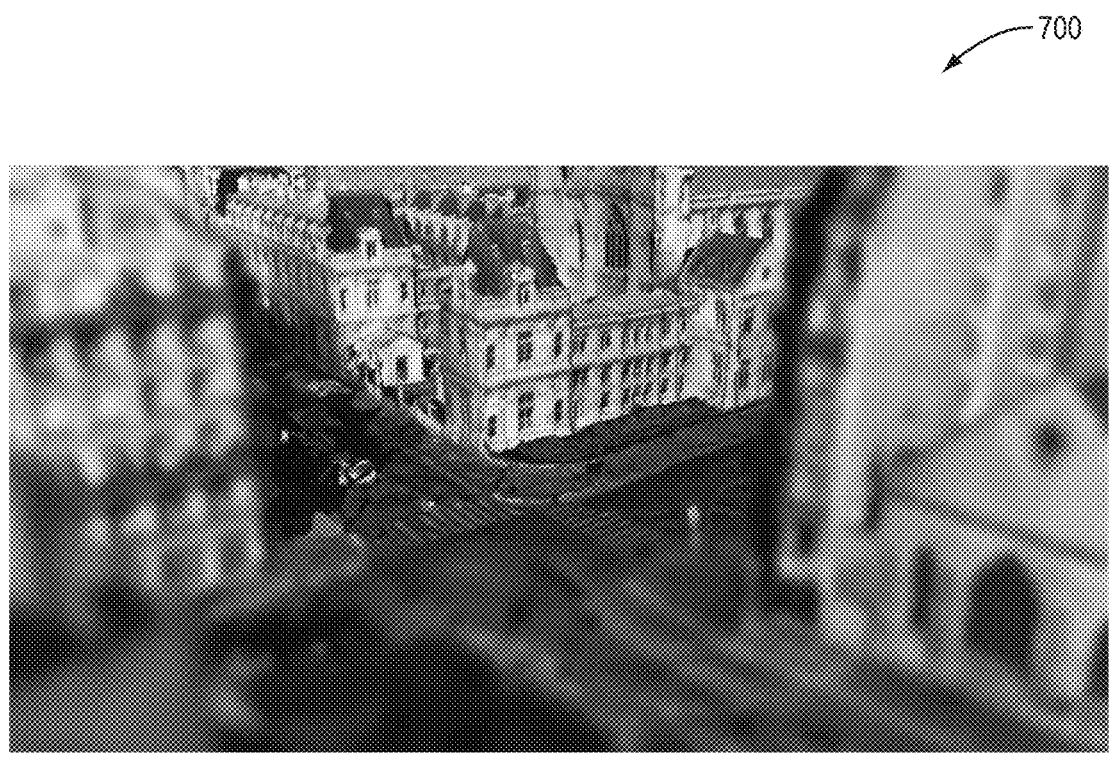
FIG. 7 is an obfuscation-filtered view created by blurring the rendered view of FIG. 5 where uncertainty in screen space is beyond the limit of data accuracy.

Any of a variety of obfuscation filters may be utilized, including filters that blur, pixilate, edge enforce, etc. FIG. 7 is an obfuscation-filtered view 700 created by blurring the rendered view 500 of FIG. 5 where uncertainty in screen space is beyond the limit of data accuracy. The obfuscation filter may perform the blurring by adapting any of a number of existing algorithms, for example, by adapting a depth of field algorithm such as the Reverse-Mapped Z-Buffer Depth of Field algorithm to utilize uncertainty (e.g., circles of uncertainty) instead of confusion (e.g., circles of confusion). The amount of blurring may be weighted based on uncertainty in screen space to visually quantify uncertainty. For example, as can be seen in FIG. 7, strong blurring may be applied in the foreground where uncertainty is greatly above the limit of data accuracy, and light blurring may be applied in the midground where uncertainty is only slightly above the limit of data accuracy. No blurring may be applied in the background where uncertainty is below the limit of data accuracy.

Figure 8:
FIG. 8 is an obfuscation-filtered view created by pixilating the rendered view of FIG. 5 where uncertainty in screen space is beyond the limit of data accuracy.

FIG. 8 is an obfuscation-filtered view 800 created by pixilating the rendered view 500 of FIG. 5 where uncertainty in screen space is beyond the limit of data accuracy. The obfuscation filter may perform the pixilating by adapting any of a number of existing algorithms, with the amount of pixilating is weighted based on uncertainty in screen space to visually quantify uncertainty. Pixilating may yield pixel cell sizes that are easily readable and thereby provide a clear visually quantification of uncertainty.

Figure 9:
FIG. 9 is an obfuscation-filtered view created by edge enforcing the rendered view of FIG. 5 where uncertainty in screen space is beyond the limit of data accuracy.

FIG. 9 is an obfuscation-filtered view 900 created by edge enforcing the rendered view 500 of FIG. 5 where uncertainty in screen space is beyond the limit of data accuracy. The obfuscation filter may perform the edge enforcing by adapting any of a number of existing algorithms, with the amount of edge enforcing weighted based on uncertainty in screen space to visually quantify uncertainty. Edge enforcing mainly impacts the perception of geometry details. As it does not impact areas with no edges, it may be of particular use in combination with other obfuscation filtering techniques.

Figure 10:
FIG. 10 is a blended obfuscation-filtered view created by blending a blurred obfuscated view generated from the original rendered view of FIG. 5 with the original rendered view, according to a weighting percentage.

Several different obfuscation filters may be applied together. For example, blurring and edge enforcing may be applied together. Similarly, an obfuscation-filtered view may be mixed with other views, including the original rendered view. FIG. 10 is a blended obfuscation-filtered view 1000 created by blending a blurred view generated from the original rendered view 500 of FIG. 5 with the original rendered view 500, according to a weighting percentage (e.g., 50% from the blurred view and 50% from the original rendered view). Such mixing may increase intelligibility and improve perception of features.

It should be understood that various adaptations and modifications may be readily made to what is described above, to suit various implementations and environments. For example, while it is discussed above that the techniques may be applied to a multi-dimensional (e.g., 3-D) mesh that has, for example, been generated by SfM photogrammetry, it should be understood that the techniques may be used with other representation of a scene (e.g., other 3-D representations of a scene) in the physical environment. Such other representations may include unstructured point clouds, bitmaps, or other types of graphics. While it is discussed above that many aspects of the techniques may be implemented by specific software processes executing on specific hardware, it should be understood that some or all of the techniques may also be implemented by different software on different hardware. In addition to general-purpose computing devices/electronic devices, the hardware may include specially configured logic circuits and/or other types of hardware components. Above all, it should be understood that the above descriptions are meant to be taken only by way of example.

What is claimed is:

1. A method for representing uncertainty when displaying a multi-dimensional mesh, comprising:
   rendering, by an application executing on a computing device, a view of the multi-dimensional mesh;
   determining uncertainty corresponding to the rendered view by
      obtaining uncertainty in model space for each point of the multi-dimensional mesh visible in the rendered view, and
      based on the uncertainty in model space, computing uncertainty in screen space for each point of the multi-dimensional mesh visible in the rendered view;
   applying an obfuscation filter to the rendered view that modifies the rendered view based on the uncertainty in screen space for each point to obfuscate detail in at least a portion of the rendered view to provide a visual indication of uncertainty; and displaying, in a user interface of the application, the obfuscation-filtered rendered view.

2. The method of claim 1, wherein the applying the obfuscation filter further comprises:

where uncertainty in screen space is within a limit of data accuracy, showing the rendered view without modification; and where uncertainty in screen space is beyond the limit of data accuracy, obfuscating detail in the rendered view.

3. The method of claim 2, wherein the obfuscating detail comprises at least one of blurring, pixilating or edge enforcing the rendered view.

4. The method of claim 2, wherein an amount of the obfuscating detail is weighted based on uncertainty in screen space to visually quantify uncertainty.

5. The method of claim 1, wherein the uncertainty in model space for each point forms a sphere about the point, and the computing uncertainty in screen space for each point comprises:

projecting the sphere on a screen to form a region of pixels; and determining a bounding circle for the region having a diameter that serves as the uncertainty in screen space.

6. The method of claim 1, wherein the uncertainty in model space for each point is a numeric value in a unit of distance corresponding to a maximal deviation from a point.

7. The method of claim 1, wherein the rendered view is an original frame having a plurality of pixels and the computing uncertainty in screen space for each point produces an uncertainty image having same dimensions as the original frame that provides an uncertainty in screen space for each pixel in the original frame.

8. The method of claim 7, wherein the applying the obfuscation filter further comprises:

providing at least the original frame and the uncertainty image as inputs to the obfuscation filter; and producing an obfuscated frame by the obfuscation filter as an output, wherein the obfuscated frame is used as the obfuscation-filtered rendered view.

9. The method of claim 1, further comprising:

generating the multi-dimensional mesh by a structure from motion (SfM) photogrammetry application based on a set of images or point clouds of the physical environment captured by one or more cameras or scanners.

10. A computing device comprising:

a display screen;

a processor; and a memory coupled to the processor and configured to store a multi-dimensional mesh and an application, the application when executed operable to:

render a view of the multi-dimensional mesh;

determine uncertainty corresponding to the rendered view by obtaining uncertainty in model space for each point of the multi-dimensional mesh visible in the rendered view, and based on uncertainty in model space, computing uncertainty in screen space for each point of the multi-dimensional mesh visible in the rendered view;

where uncertainty in screen space is within a limit of data accuracy, display the rendered view on the display screen without modification; and where uncertainty in screen space is beyond the limit of data accuracy, obfuscate detail in the rendered view to provide a visual indication of uncertainty and display the obfuscated detail.

11. The computing device of claim 10, wherein the obfuscating detail comprises at least one of blurring, pixilating or edge enforcing the rendered view.

12. The computing device of claim 10, wherein an amount of the obfuscating detail is weighted based on uncertainty in screen space to visually quantify uncertainty.

13. The computing device of claim 10, wherein the multi-dimensional mesh is a structure from motion (SfM) photogrammetry-generated mesh based on a set of images or point clouds of the physical environment.

14. A non-transitory electronic-device readable medium having instructions stored thereon, the instructions when executed by one or more electronic devices operable to:

render a view of a scene;

compute uncertainty in screen space for each point of the scene visible in the rendered view;

apply an obfuscation filter to the rendered view that modifies the rendered view based on the uncertainty in screen space for each point, the obfuscation filter to show the rendered view without modification where uncertainty in screen space is within a limit of data accuracy and to obfuscate detail in the rendered view where uncertainty in screen space is beyond the limit of data accuracy to provide a visual indication of uncertainty; and display the obfuscation-filtered rendered view.

15. The non-transitory electronic-device readable medium of claim 14, wherein the instructions when executed are further operable to:

obtain uncertainty in model space for each point visible in the rendered view, wherein the computation of uncertainty in screen space for each point is based on the uncertainty in model space.

16. The non-transitory electronic-device readable medium of claim 15, wherein the uncertainty in model space for each point is a numeric value in a unit of distance corresponding to a maximal deviation from a point which forms a sphere about the point, and the instructions when executed are further operable to:

for each point, project the sphere on a screen to form a region of pixels; and determine a bounding circle for the region having a diameter that serves as the uncertainty in screen space.

17. The non-transitory electronic-device readable medium of claim 14, wherein the rendered view is an original frame having a plurality of pixels and the computation of uncertainty in screen space for each point produces an uncertainty image having same dimensions as the original frame that provides an uncertainty in screen space for each pixel in the original frame.

18. The non-transitory electronic-device readable medium of claim 17, wherein the instructions when executed are further operable to:

provide at least the original frame and the uncertainty image as inputs to the obfuscation filter; and produce an obfuscated frame by the obfuscation filter as an output, wherein the obfuscated frame is used as the obfuscation-filtered rendered view.

19. The non-transitory electronic-device readable medium of claim 14, wherein the scene is a three-dimensional mesh.

20. The non-transitory electronic-device readable medium of claim 19, wherein the instructions when executed are further operable to:
  generate the three-dimensional mesh by a structure from motion (SfM) photogrammetry application based on a set of images or point clouds of the physical environment captured by one or more cameras or scanners.

21. A method for representing uncertainty when displaying a multi-dimensional mesh, comprising:
  rendering, by an application executing on a computing device, a view of the multi-dimensional mesh;
  computing uncertainty in screen space for each point of the scene visible in the rendered view;
  applying an obfuscation filter to the rendered view that modifies the rendered view based on the uncertainty in screen space for each point, the obfuscation filter to show the rendered view without modification where uncertainty in screen space is within a limit of data accuracy and to at least one of blur, pixilate or edge enforce the rendered view where uncertainty in screen space is beyond the limit of data accuracy; and
  displaying, in a user interface of the application, the obfuscation-filtered rendered view.

22. The method of claim 21, wherein an amount of blurring, pixilating or edge enforcing imposed by the obfuscation filter is weighted based on uncertainty in screen space to visually quantify uncertainty.

23. The method of claim 21, further comprising:
  obtaining uncertainty in model space for each point visible in the rendered view,
  wherein the computing uncertainty in screen space for each point is based on the uncertainty in model space.

* * * * *